E. G. TJOSSEM.
SEED CORN TESTING MACHINE.
APPLICATION FILED FEB. 21, 1917.
1,238,956.
Patented Sept. 4, 1917.
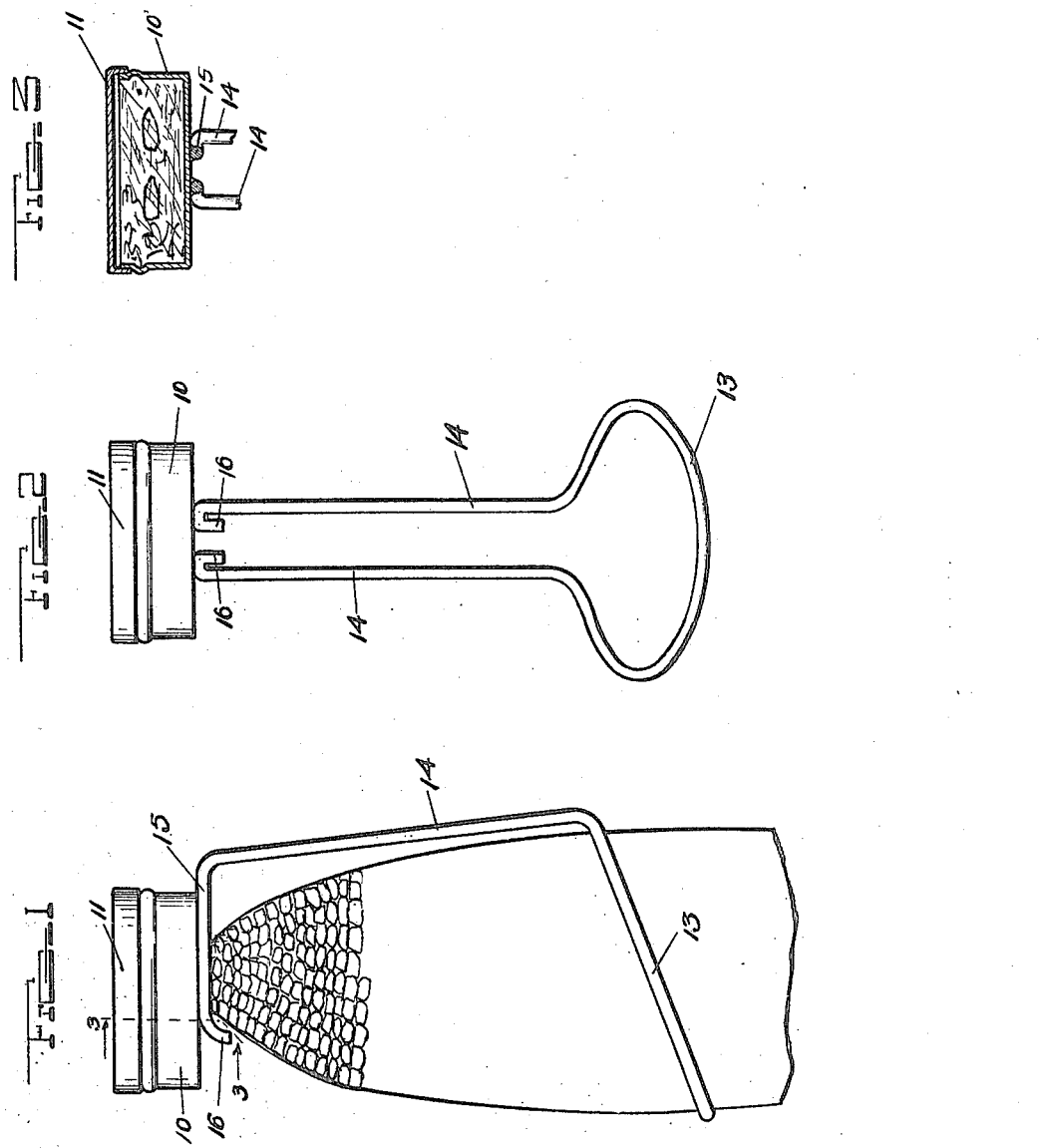
Inventor
Earl Tjossem

UNITED STATES PATENT OFFICE.

EARL GLENARD TJOSSEM, OF DES MOINES, IOWA.

SEED-CORN-TESTING MACHINE.

1,238,956.  Specification of Letters Patent.  Patented Sept. 4, 1917.

Application filed February 21, 1917. Serial No. 150,125.

*To all whom it may concern:*

Be it known that I, EARL GLENARD TJOSSEM, a citizen of the United States, residing at Des Moines, in the county of Polk and State of Iowa, have invented a new and useful Seed-Corn-Testing Machine, of which the following is a specification.

My invention relates to improvements in seed corn testing appliances.

The object of my invention is to provide an individual tester for each ear of corn, whereby each ear may be tested with but one operation, thereby doing away with the present system involving the use of numbered compartments and other devices employed to divide the kernels tested with their respective ears.

More particularly it is my object to provide for each ear of corn a small receptacle with a wire device secured thereto, having a loop adapted to be mounted on an ear of corn, the wire being so made as to be capable of being arranged to be snugly mounted on an ear of corn.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a portion of an ear of corn having one of my improved seed corn testing appliances installed thereon.

Fig. 2 shows a top or plan view of my device, and

Fig. 3 shows a sectional view taken on the line 3—3 of Fig. 1.

In the form of my invention, illustrated in the accompanying drawings, I have used the reference numeral 10 to indicate generally a receptacle, preferably in the form of a small metal box having a removable cover 11. For mounting the box 10 on an ear of corn 12 I provide the following means.

A single piece of wire adapted to be bent to various positions and hold such device is employed. At the central portion of the wire I form a loop 13 adapted to encircle and receive an ear of corn at a point spaced from its ends.

The wire is spaced away from the ends of the loop 13 in parallel members 14, as shown in Figs. 1 and 2.

At the forward or outer ends of the members 14 are formed substantially parallel right-hand extensions 15, which are secured to the bottom of the receptacle or box 10 in any suitable manner.

At the ends of the members 15 farthest from the extensions 14 are short extensions 16 substantially parallel with the members 14 and extending toward the loop 13, as clearly shown in Figs. 1 and 2.

In the practical use of my improved device, the box 10 is partially filled with an absorbent which may be moist earth, sawdust or any suitable material adapted for sprouting corn.

The material used in the box, must, of course, be properly moistened for the purpose. In preparing the corn for sprouting, I preferably provide a table or support having the projecting top provided with two small openings adapted to receive the members 16. The members 16 are driven into said openings, whereupon the receptacle 10 will rest on the top of the table or the like with the members 14 extending downwardly along side the table and with the loop 13 arranged beneath said top. The box is then firmly held in horizontal position while the kernels are taken from the ear and embedded in the material in the box.

The cover 11 is then placed on the box, the device is removed from the table and the loop 13 is slipped over the ear of corn from the pointed end thereof. The wire of which the loop is formed may be readily bent to make it fit ears of corn of any size.

The holding device will firmly hold the box on the ear of corn from which the kernels in the box have been taken, so that there will be no danger of confusion in making the test.

It should perhaps be noted that the members 14 are on one side of the point of the ear of corn, and the members 16 are on the opposite side thereof, and that they thus coact in properly holding the device on the ear of corn.

The tester may then be left on the ear until the kernels are sprouted.

It may be mentioned in this connection that my device is especially adapted for use with ears of corn kept in a rack or other device for holding ears of seed corn.

After the kernels have been left in the tester box for a proper length of time, the tester device is removed from the ear and the good and bad kernels are counted, and the corresponding ear discarded or saved as the person making the test may see fit.

It will be seen that with my appliance the test for each ear is made with absolute accuracy.

The advantages of a device of this kind for accurately testing the kernels of each individual ear of corn are obvious from the description of the device.

Some changes might be made in the construction and arrangement of the parts of my improved seed testing device without departing from the essential features and spirit of my invention, and it is my intention to cover by this application any such changes which may be included within the scope of my claims.

I claim as my invention:

1. A seed corn testing device, comprising a box, a removable cover therefor, a supporting member including a loop adapted to encircle and receive an ear of corn at points spaced from the ends thereof, forwardly projecting members at the ends of said loop, extensions on the forward ends of said members arranged substantially at right-angles to said members and secured to said box.

2. A seed corn testing device, comprising a box, a removable cover therefor, a supporting member including a loop adapted to encircle and receive an ear of corn at points spaced from the ends thereof, forwardly projecting members at the ends of said loop, extensions on the forward ends of said members arranged substantially at right-angles to said members and secured to said box, and extensions at the end of said first extensions inclined toward said loop.

EARL GLENARD TJOSSEM.

Copies of this patent may be obtained for five cents each, by addressing the "Commissioner of Patents, Washington, D. C."